June 30, 1931.  W. J. TEETERS  1,812,729
ROTARY GASOLINE MOTOR
Filed Oct. 21, 1927  3 Sheets-Sheet 1

W. J. Teeters INVENTOR
BY Victor J. Evans
ATTORNEY

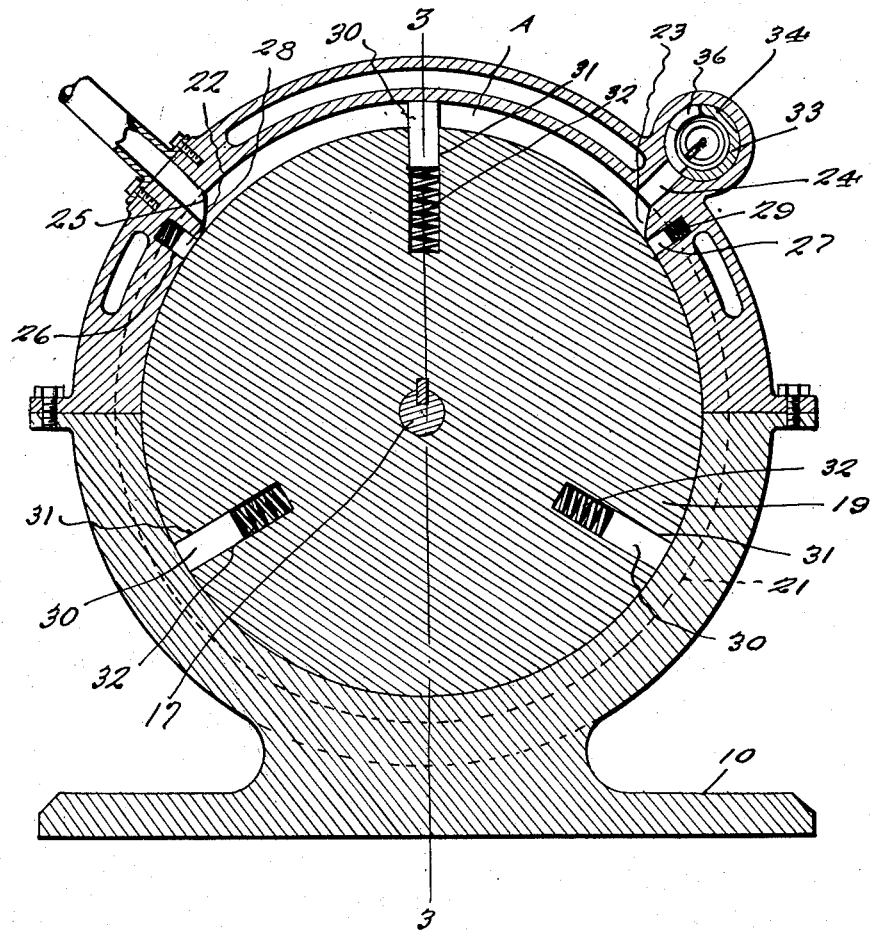

June 30, 1931.   W. J. TEETERS   1,812,729
ROTARY GASOLINE MOTOR
Filed Oct. 21, 1927   3 Sheets-Sheet 3
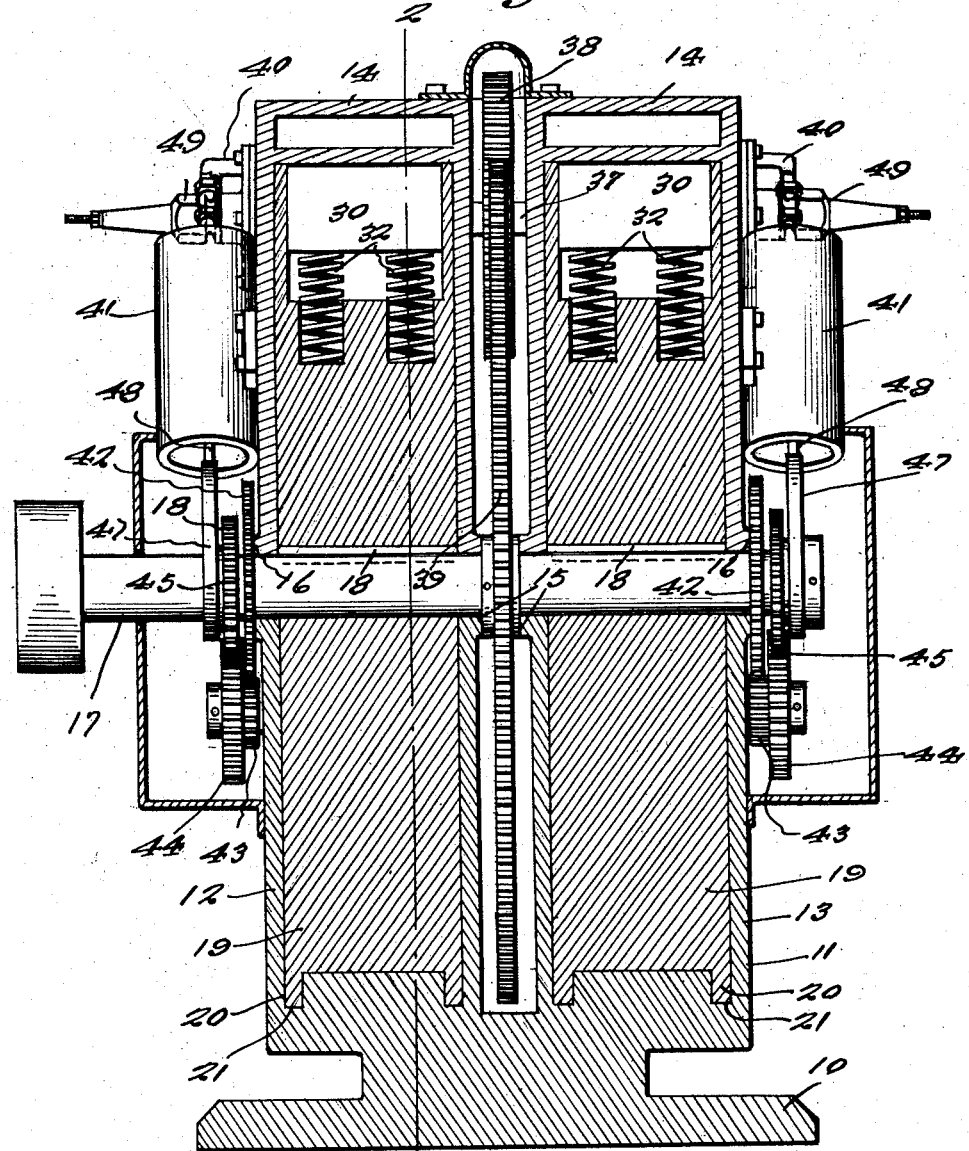
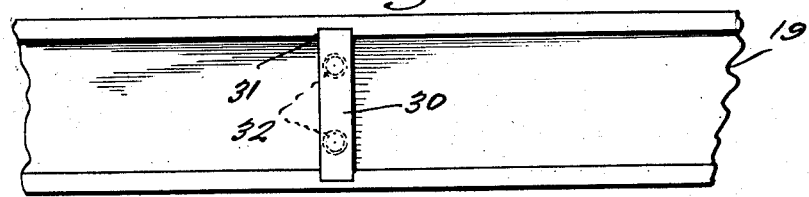

Patented June 30, 1931

1,812,729

UNITED STATES PATENT OFFICE

WILSON J. TEETERS, OF LYONS, NEBRASKA

ROTARY GASOLINE MOTOR

Application filed October 21, 1927. Serial No. 227,799.

The present invention relates to rotary gasoline motors and has for its object to improve motors of this character.

More specifically, the objects of the invention are to increase the efficiency of a rotary motor and to provide for a maximum amount of power with a minimum consumption of gas.

Further objects are compactness of construction and to simplify the construction and lighten the weight of the motor, the elimination of parts which are likely to get out of order, and to reduce the number of bearings to a minimum.

Other objects and advantages will appear from the following specification and will be set forth in the appended claim, and I do not wish to be limited in the scope of my invention except as I shall be limited by said claim.

In the drawings:

Figure 2 is a section through the motor on the line 2—2 of Figure 3.

Figure 3 is a sectional view on the line 3—3 of Figure 2.

Figure 4 is a fragmentary detail view showing the relation of the piston to the rotating drum.

Figure 6 is a detail view of the feed valve for the motor on an enlarged scale.

Figure 1:
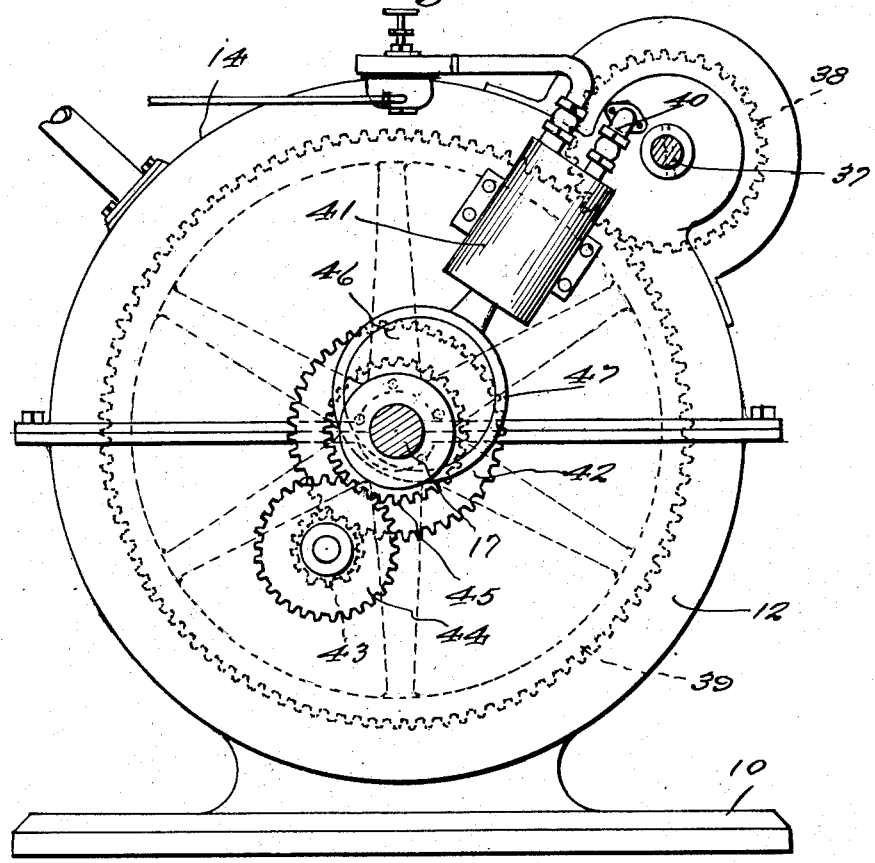
Figure 1 is a side elevation of a motor constructed in accordance with my invention.
Figure 7:
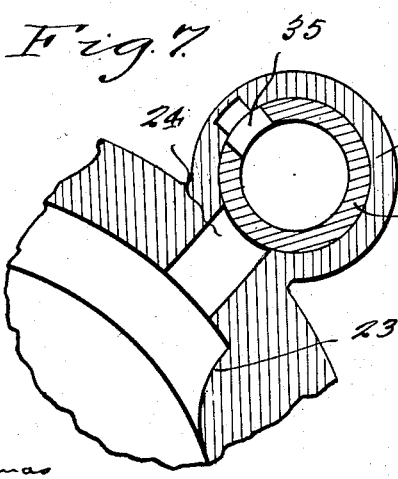
Figure 7 is a fragmentary view, showing the feed valve within the feed valve casing.
Figure 5:
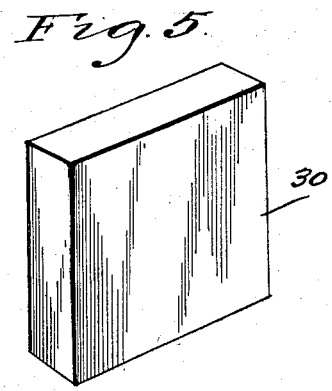
Figure 5 is a detail of one of the pistons on an enlarged section.

Referring to the drawings in detail, 10 designates a base supporting a pair of casings 11 comprising side walls 12 and 13 and substantially cylindrical connecting walls 14, the side walls being centrally apertured and provided with bearings 15 and 16 to support the drive shaft 17 projecting therethrough.

Keyed to the shaft within the casings by means of key members 18 are rotating drums or rotors 19, cylindrical in shape and provided with side flanges 20 projecting beyond the cylindrical surface of the rotor and riding in annular grooves 21 formed within the casings.

The upper inner surface of the casings are recessed between shoulders 22 and 23 to provide combined expansion and combustion chambers A, said chambers being in communication with a supply of fuel through a port 24 and having at their opposite ends exhaust ports 25. Formed in the inner surfaces of the walls of the casings and adjacent the shoulders 22 and 23 are recesses 26 and 27 having therein spring-pressed guard members 28 and 29 projecting outwardly against the peripheries of the drums to prevent the escape of gases from the chambers A, except through the exhaust ports at 25.

Set within the peripheries of the drums are flat rectangular piston members 30 slidably mounted in recesses 31 and pressed outwardly against the inner peripheries of the cylindrical walls of the casings by means of springs 32, said pistons being held retracted in the recesses 31 by the inner peripheries of the cylindrical walls, except when passing through the chambers A. The width of the pistons, it should be understood, is sufficient to extend the entire width of the chambers A, thereby preventing the escape of an appreciable amount of gas past the pistons when passing through said chambers. As shown in the drawings, there are three of these pistons, although any desired number may be employed and the showing of three is merely to be considered illustrative of the principles of the invention.

The feed of gas to the chambers A must be so timed and in such quantity as to provide a sufficient charge in the rear of each piston after it has passed by the intake port at 24. In consequence I have provided rotating cylindrical valve members 33 within valve casings 34, said casings being in communication with the chambers A through the ports 24. The valve members 33 are sealed at their ends by the walls of the casings 34 which are secured to the casings 11 and are provided in their sides with intake and outlet ports 35 and 36. The valves associated with both casings are provided with common stems 37 connecting them together and carrying thereon at the middle point a gear 38 meshing in a 1-3 relationship with a gear 39 mounted for rotation therewith on the shaft 17 and lying between the two casings. Gas is fed to the interior of the valves 33 by means of conduits 40 leading from the ends of compressors 41 having compressing mechanism therein for compressing the gas, which are also operated by the shaft 17 in a 3-1 relationship through trains of gears 42, 43, 44 and 45, the gear 42 being secured to the shaft 17 for rotation therewith and being in 3-1 relationship with the gears 43, the gears 44 and 45 being of the same size, and the gears 43 and 44 being connected together and the gears 45 being rotatably mounted relative to the shaft 17 and mounted thereupon. The gears 45 are connected with eccentrics 46 upon which the eccentric bands 47 are loosely mounted in the usual manner, the eccentric bands having piston rods 48 projecting therefrom and into the cylinder 41.

It will appear from the foregoing description and the disclosure in the drawings, that for each rotation of the drums 19, there will be compressed, ignited and delivered to the chambers A, a charge, the timing of the ignition and delivery being such that the ignited charge is delivered just after the piston 30 has passed the intake port 24. In other words, when the piston has passed the intake port, a sufficient distance, the charge is ignited by means of spark plugs 49 which have their spark gaps arranged in the valve members 33 as best shown in Figure 2, and the charge is passed through the outlet ports 36 into the ports 24 and thence to the combined expansion and combustion chambers A whereby the explosion takes place as above set forth, but of course that part of the charge in the ports 24, outlet ports 36, and valve members 33, will be ignited simultaneously with that part of the charge in the combined expansion and combustion chamber A. While the chambers A have been termed combined combustion and expansion chambers, it will be obvious that the combustion takes place in the spaces between the shoulders 23 and the pistons 30 that are disposed adjacent but beyond the ports 24.

By the arrangement as described above I am enabled to get a high efficiency in a motor of this character with a comparatively small expenditure of fuel. I have accomplished this with a mechanism having as one of its main features simplicity of construction. I have been able to do away with a multiplicity of bearings and of operating elements without sacrificing efficiency, but on the contrary increasing the efficiency of my device over devices of the character now in use.

Having described my invention, what I claim is:

A rotary engine including a support, a pair of circular spaced casings mounted on said support and having spaced annular grooves adjacent the side walls and combined expansion and firing chambers in the upper portions thereof, a drive shaft journaled in said casing, rotors secured to the shaft within said casings, annular flanges on the periphery of the rotors and extending into the grooves, spring pressed pistons carried by the rotors, said casings having intake and exhaust ports located at opposite ends of the chambers, a valve mechanism for controlling the intake ports, spring pressed guard members adjacent the ends of the chambers and bearing against the rotors, fuel compressors located at the sides of the casings and connected to the intake ports and to a fuel supply, gears located between the casings and driven by the shaft to rotate the valve mechanism, and eccentric means at the ends of the shaft to operate the compressors.

In testimony whereof I affix my signature.

WILSON J. TEETERS.